United States Patent

Link

[11] Patent Number: 6,088,105
[45] Date of Patent: Jul. 11, 2000

[54] MEASURING UNIT FOR DETERMINING DIMENSIONS OF TEST PIECES, PREFERABLY OF HOLLOW BODIES, IN PARTICULAR, OF BORES OF WORKPIECES, AND METHOD FOR MEASURING SUCH DIMENSIONS

[75] Inventor: Hans-Jörg Link, Stuttgart, Germany

[73] Assignee: Joh. & Ernst Link GmbH & Co. KG

[21] Appl. No.: 09/285,599

[22] Filed: Apr. 2, 1999

[30] Foreign Application Priority Data

Apr. 4, 1998 [DE] Germany ............... 198 15 201

[51] Int. Cl.⁷ ............... G01B 11/14; G01B 11/00; G01B 11/22; G01B 11/24
[52] U.S. Cl. ............... 356/374; 356/372; 356/375; 356/376; 356/378; 356/384
[58] Field of Search ............... 356/374, 372, 356/375, 376, 378, 384

[56] References Cited

U.S. PATENT DOCUMENTS

| 4,131,365 | 12/1978 | Pryor . |
| 4,403,860 | 9/1983 | Pryor . |
| 4,618,884 | 10/1986 | Nagasaki . |
| 4,637,715 | 1/1987 | Idesawa . |
| 5,871,391 | 2/1999 | Pryor . |

*Primary Examiner*—Frank G. Font
*Assistant Examiner*—Roy M. Punnoose
*Attorney, Agent, or Firm*—Robert W. Becker & Associates

[57] ABSTRACT

A measuring unit for determining dimensions of workpieces has an endoscope unit with two apertures through which identical linear light patterns are projected onto a surface of the workpiece. The identical linear light patterns create a moiré pattern on the surface. The endoscope unit has at least one camera head for detecting the moiré pattern.

19 Claims, 5 Drawing Sheets

MEASURING UNIT FOR DETERMINING DIMENSIONS OF TEST PIECES, PREFERABLY OF HOLLOW BODIES, IN PARTICULAR, OF BORES OF WORKPIECES, AND METHOD FOR MEASURING SUCH DIMENSIONS

BACKGROUND OF THE INVENTION

The present invention relates to a measuring unit for determining dimensions of test pieces, preferably of hollow bodies, e.g., bores of workpieces, and a method for measuring such dimensions.

During machining of, e.g., workpieces it is normally necessary that the precision in the machining process meets certain specifications. For example, a bore must have a circular cross-section and cannot have a noncircular cross-section. Subsequently to the machining process, in order to check the machining quality, the workpieces are checked manually or in test stations as to whether they meet the required machining quality. If a machining flaw is discovered, the workpiece either has to be machined again or it is scrap. Reworking the workpiece requires additional machining time.

It is an object of the invention to design a measuring unit and method of the aforementioned kind such that the dimensions of the test pieces can be determined highly accurately and reliably.

SUMMARY OF THE INVENTION

As a solution to this object, the inventive measuring unit and the inventive method provide that two linear patterns are projected in superposition by an endoscope optic onto a surface of the test piece or workpiece to be measured, such that a moiré pattern is created on the surface. This moiré pattern can be detected by a camera and evaluated. The dimensions to be measured can be determined easily and yet highly accurately on the test piece from the evaluation result.

BRIEF DESCRIPTION OF THE DRAWINGS

The object and advantages of the present invention will appear more clearly form the following specification in conjunction with the accompanying drawings, in which.

DESCRIPTION OF PREFERRED EMBODIMENTS

The present invention will now be described in detail with the aid of several specific embodiments utilizing FIGS. 1–5.

The measuring unit is designed to determine dimensions of hollow bodies, preferably, bores of workpieces in a simple, yet accurate way. For example, the diameter of a bore of a workpiece can be easily and accurately determined with the help of the measuring unit. It is possible to measure the dimensions already while the workpiece is being machined by a tool and/or to control online the tool or the workpiece to be machined until the desired result is reached. No moving or changing of the tool and/or the workpiece is required in between the various machining and measuring cycles with respect to the workpiece. Rather, the machining result, the roundness of a bore or its diameter, e.g., are preferably measured and evaluated immediately during the machining process. Machining flaws can thus be instantly identified and corrected. No further quality check is necessary once the machining process on the workpiece is completed. Since corrections can be performed during the machining procedure, the time periods for machining are very short and, above all, excellent quality results are achieved. Also the service life of the tool is increased because the tool can be used for machining for an optimum length of time since online measuring and evaluation are performed during the machining procedure.

It is also possible to perform the machining process on the workpiece with the tool and to measure and evaluate the machining result immediately thereafter. If the machining result does not meet the desired specifications, the tool and/or the workpiece are immediately subsequently adjusted as required and the workpiece can be re-machined.

With the aid of the drawings, one variant of the invention is to be described according to which measuring of the machining result is performed already during machining.

Figure 1:
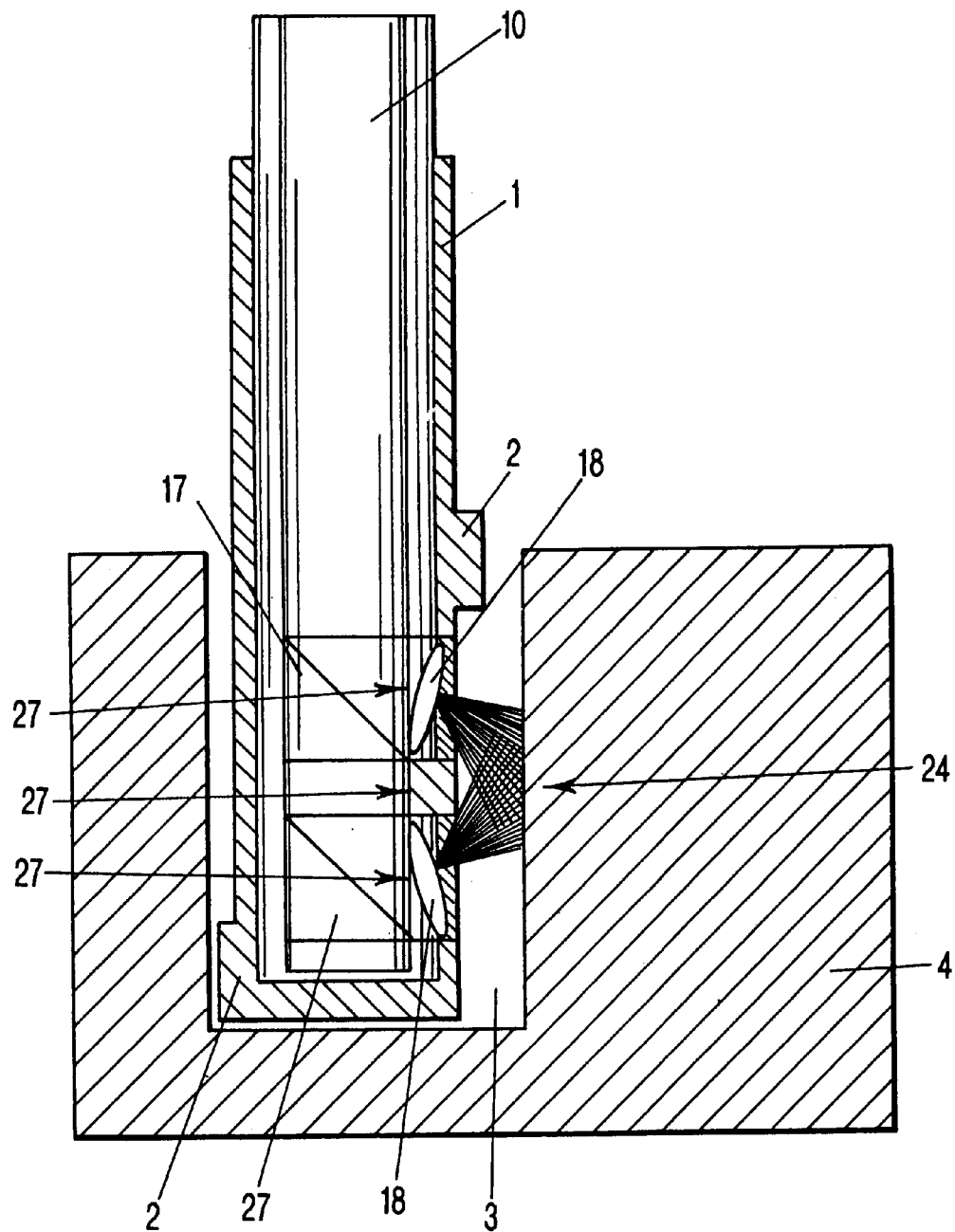
FIG. 1 shows a schematic view of an inventive measuring unit arranged in a tool.
Figure 2:
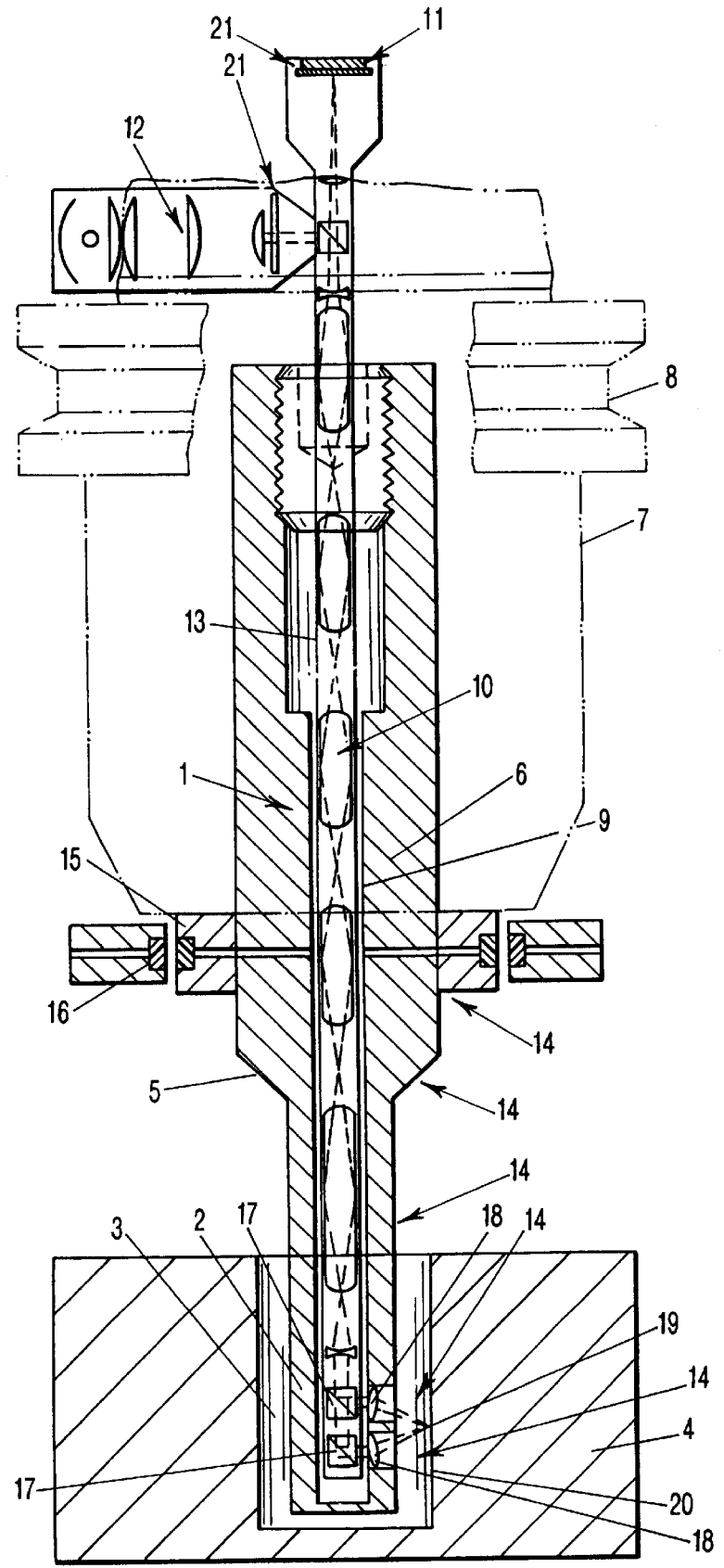
FIG. 2 shows an axial, enlarged view of the tool with the inventive measuring unit.

FIGS. 1 and 2 schematically illustrate a tool 1 which can be a milling tool, a drill or the like. The tool 1 comprises a machining portion 2 with which a bore 3 can be produced and/or machined in a workpiece 4. The machining portion 2 has a conical transition portion 5 into a clamping shaft 6. A tool 1 is clamped in the clamping shaft 6 and secured in a tool receiver 7 as is known in the art. The tool receiver 7 is indicated in FIG. 2 by the dot-dash lines and is provided with a gripping groove 8 which can be engaged by a grip of a handling tool, e.g., a tool changer, as is known in the art. The tool receiver 7 is inserted into a spindle unit of a machine tool and is rotatably driven as is known in the art.

The conical transition portion 5 of the tool 1 tapers toward the machining portion 2 and is arranged at an axial distance relative to the tool receiver 7 and to the workpiece 4 which is being machined by the tool 1.

The tool 1 has a central axial bore 9 in which an endoscope unit (optic) 10 is provided. The bore 9 extends over the entire length of the tool 1 and is closed off at the end at which the workpiece is positioned so that chips and the like that are produced during machining of a workpiece 4 cannot enter the endoscope unit 10. The endoscope unit 10 extends through the tool receiver 7 up to a camera head 11 which can be stationary but can also be movable with the endoscope unit 10. Within the tool receiver 7 a lighting unit 12 with a mark projector is provided and produces the required amount of lighting for the endoscope unit 10 as is known in the art.

Depending on the requirements of its mechanical embodiment, the optic comprising the camera head 11 and the mark projector 12 (lighting unit) can be embodied to be folded by known optical methods.

The endoscope unit 10 is provided with a thin tube 13 that is positioned within the central bore 9 of the tool 1 and is provided with a lens system or a glass fiber optic. The tool 1 is provided with at least one view opening 14 through which the endoscope unit 10 can view the area machined by the tool 1. In FIG. 2, arrows indicate that the view opening 14 can be provided at various locations of the tool 1. The location of the view opening 14 depends on which kind of machining is to be performed on a workpiece 4 and/or which area of a workpiece is to be monitored during the machining operation. It is, of course, also possible to provide the tool 1 with two or more view openings 14 at different locations. The endoscope unit 10 is arranged such that monitoring the machining results is possible through a respective view opening 14. For this purpose, the endoscope unit 10 is provided with a detector 27 (FIG. 1) which is arranged behind the view opening 14 and is connected to the camera head 11. If the tool 1 has two or more view openings 14 at various locations, it is advantageous to arrange the tube 13 of the endoscope unit 10 displaceably within the bore 9 of the tool 1 so that the detector 27 can be moved to be positioned behind the respective view opening 14.

A coolant can be guided through the bore 9 during machining of the workpiece 4 as is known in the art. In this case, the endoscope unit 10 is embedded within a protective cover.

The electronic signal from the endoscope unit is transmitted via two transmission rings 15 and 16. The transmission ring 15 is positioned on the clamping shaft 6 of the tool 1 and is surrounded at a small spacing by the transmission ring 16. The two transmission rings 15, 16 form contacts or transmitters/receivers for an electronic energy and signal transmission. The signals transmitted by the camera head 11 are being transmitted via this interface to the exterior to a computer that is not illustrated.

The lighting unit 12 can also be arranged outside of the tool receiver 7, for example, in the open work space. Also the mark (pattern) projector can be arranged in the open work space. At the free end of the tube 13 two apertures 13a are arranged axially in tandem at the level of the view aperture 14 to allow the light beam of the lighting unit (12) divided and deflected by beam splitters 17 to exit the endoscope unit (10). Tilted lenses 18 are positioned downstream of the beam splitters 17 (in the direction of beam propagation) and are arranged outside of the tube 13 within the view opening 14. The two lenses 18, which could also be arranged within the tube 13 of the endoscope unit 10, are slanted such that the light beam penetrating through the lenses 18 impinges on the interior wall (surface) 20 of the bore 9 of the workpiece 4 at a common area (measuring area) 19, see FIG. 2. In the illustrated embodiment, the lower half of the bore 9 of the workpiece 4 can be monitored and measured during the machining process via the view opening 14. Depending on the location of the view opening 14 various areas of the bore hole 9 can be measured, also its bottom.

The areas of the workpiece 4 detected by the detector 27 are being transmitted to the camera head 11 in the form of light signals. The camera head 11 can be provided with a polarizing or color filter 21. The lighting unit 12 can also be provided with such a polarizing or color filter 21. The camera head 11 can be embodied as is known in the art. It is designed to evaluate and process the signals as is known in the art.

For example, in the described embodiment the diameter of the bore 3 of the workpiece 4 is to be measured. To achieve a measurement, two equal linear light patterns 22 are projected via the endoscope unit 10 onto the surface (interior wall) 20 of the bore 3 in the surface area (measuring area) 19, see FIG. 5. A moiré pattern 24 (FIGS. 1 and 5) thereby forms on the surface area (measuring area ) and is detected by the detector 27. Depending on the design of the moiré pattern 24, determinations can be made with respect to the surface area 19. The two identical linear light patterns 22, 23 are projected onto the surface area or measuring area 19 via the endoscope optic 10 in a manner known in the art.

Figure 5A:
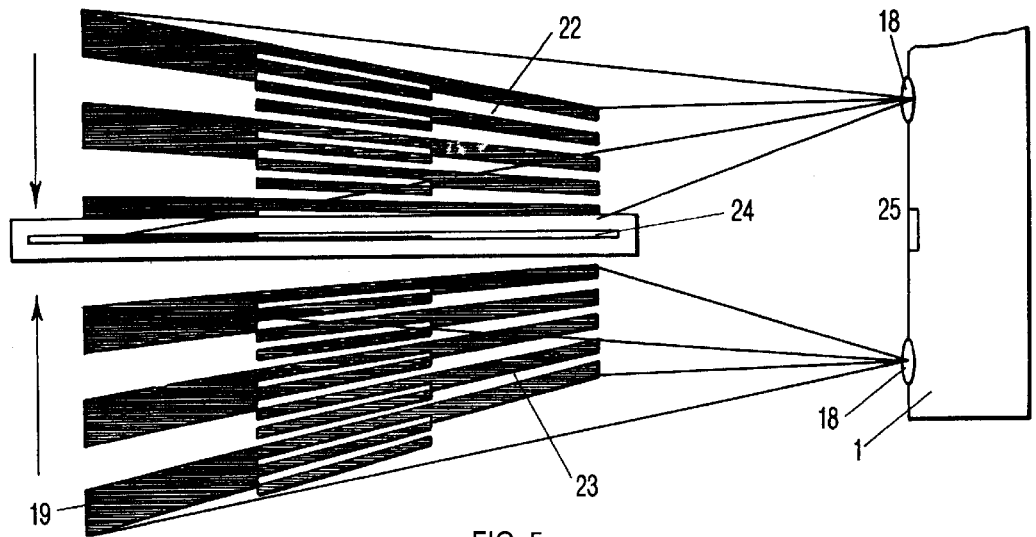
FIGS. 5a–c show a schematic view of various examples for performing the measuring procedure when two linear patterns are used.
Figure 5B:
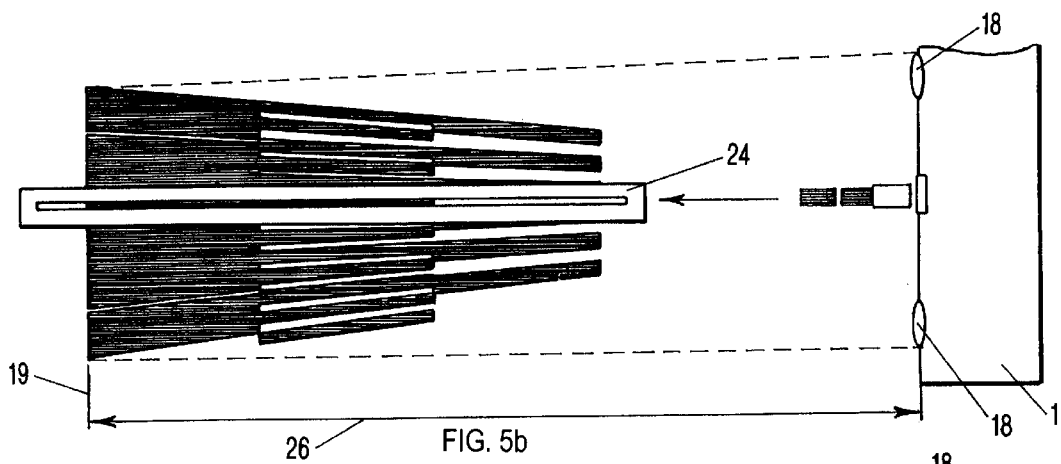
Figure 5C:
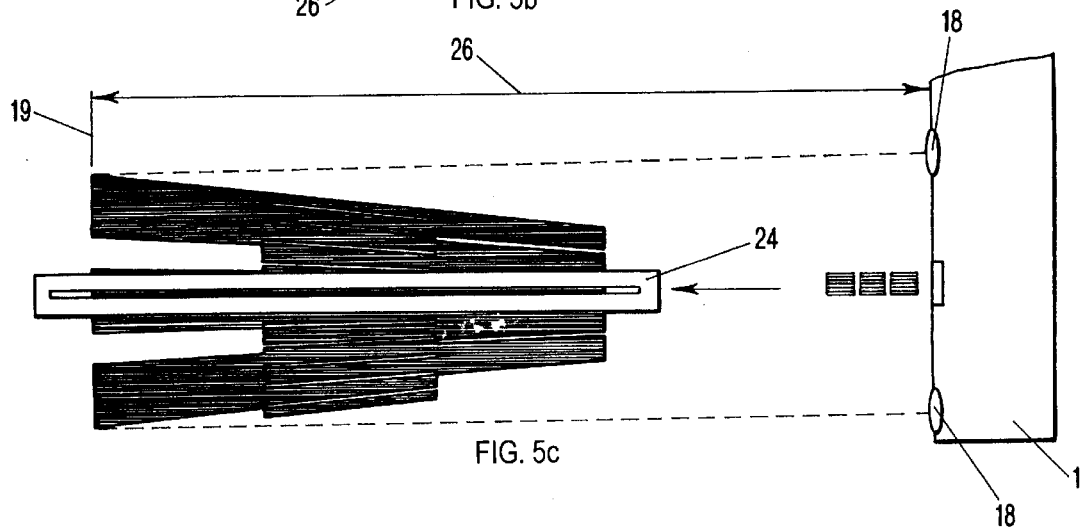

Three different moiré patterns 24 are illustrated in FIGS. 5a through 5c to serve as examples. These patterns are defined by the ratio of the base 25 (distance between the lenses 18) and its distance 26 from the projection field (measuring area) 19. In all three embodiments, the base 25 is the same. The perpendicular distance 26 between the lenses 18 and the projection surface 19 is the shortest in the embodiment illustrated in FIG. 5a. This results in a specific moiré pattern 24.

In the embodiment illustrated in FIG. 5b, the distance 26 is larger as in FIG. 5a. Accordingly, this results in a moiré pattern 24 different from the one in the embodiment illustrated in FIG. 5a In the embodiment illustrated in FIG. 5c, the distance 26 is the largest. Accordingly, this results in a yet different moiré pattern 24.

The three embodiments illustrate that a determination based on the design of the moiré pattern 24 can be made with respect to the distance between the tool 1 and the interior wall or surface 20 of the bore 9. This distance 26 is therefore also a measure for the radius or the diameter of the bore hole 9. Thus, a simple and yet highly accurate determination based on the moiré pattern 24 can be made in regard to whether the bore radius or diameter corresponds to the desired value.

Figures 3A, 3B, 3C:
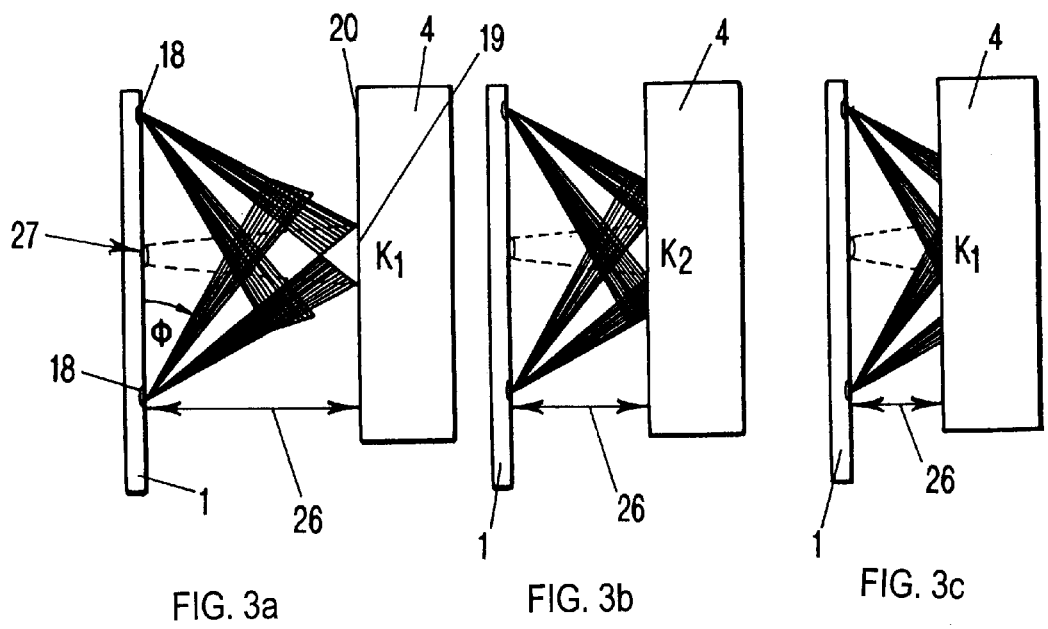
FIGS. 3a–c show a schematic view of the measuring principle when the inventive measuring unit is operating.

The general measuring method, based on the moiré pattern 24, will be described with the help of FIGS. 3a–c. The linear patterns 22, 23 (FIGS. 5a–c) comprise microscopic lines which are transformed by the moiré arrangement into macroscopic, easily identifiable designs. FIGS. 3a–c illustrates, in general, a projection unit which, in the illustrated embodiment, is comprised of the tool 1 with the endoscope unit 10. The two linear patterns 22, 23 are projected through the two lenses 18 onto the surface 20 of the object that is to be examined. In the shown embodiment, the linear patterns 22, 23 are projected onto the interior wall of the bore 3 of the workpiece 4. The detector 27 is positioned centrally between the two lenses 18. The projection field 19 on which the moiré pattern 24 forms by superposition of the linear patterns 22, 23 is detected by the detector 27. The distance between the projection unit (tool) 1 and the workpiece 4 is designated by the reference numeral 26 and is largest in the embodiment on the left in FIGS. 3a–c. The superposition of the linear patterns 22, 23 creates light-dark sequences, the light area designated as K2 and the dark area as K1. The resolution depends on the minimum achievable distance At of the light (K2)/dark (K1) sequences in the direction of the distance 26.

The distance 26 in the center embodiment (FIG. 3b) is smaller than the one in FIG. 3a. Accordingly, this results in a different light-dark sequence which results in a different moiré pattern.

In the embodiment of FIG. 3c, the distance 26 is smallest. Accordingly, this results in yet a different light-dark sequence and, therefore, also in a different moiré pattern.

Figure 4A:
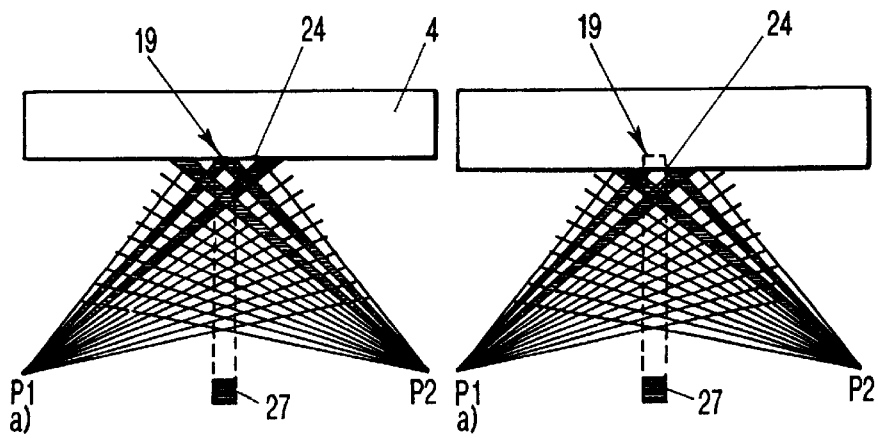
FIGS. 4a–c show an illustration according to FIGS. 3a–c of various options when performing the measuring procedure with the inventive measuring unit.
Figure 4B:
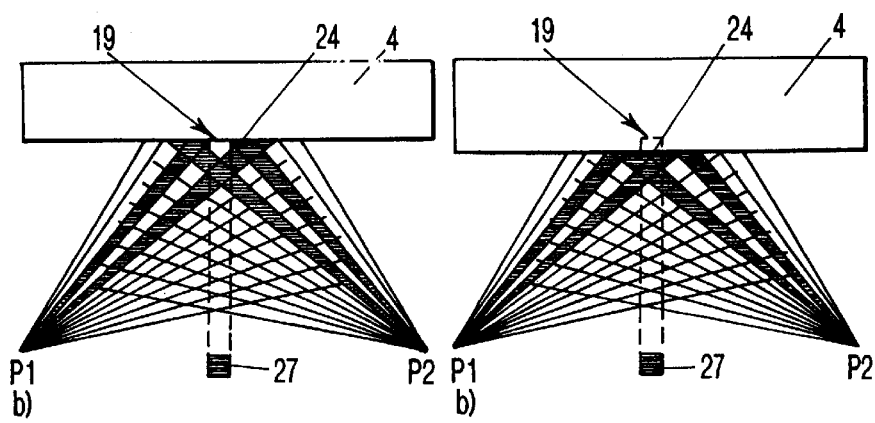
Figure 4C:
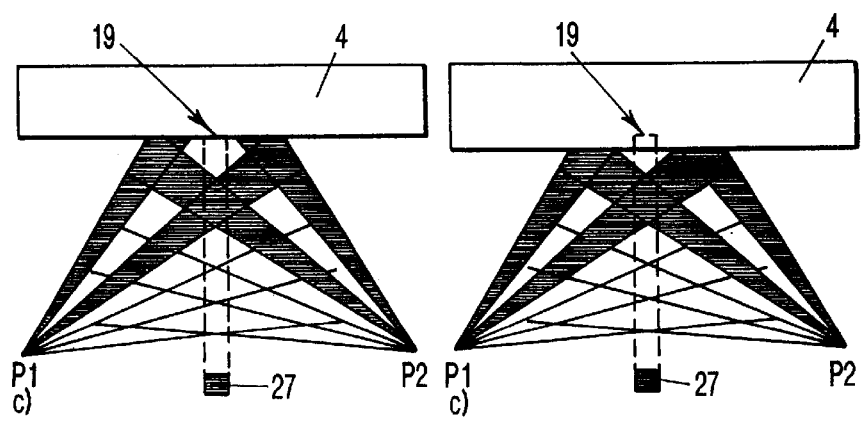
Figure 4C:

FIGS. 4a–c show that a coding and a distance determination is possible due to diverse line frequencies of the linear patterns 22 and 23. In the embodiment illustrated in FIG. 4a, a very high line frequency is present. However, a low spatial frequency as illustrated is created in the superposition area (/moiré pattern) 24 because of the moiré effect. The amplitude within the measuring area 19 changes quickly and periodically depending on the distance between the object 4 and the detector 27 (FIG. 4a, illustrations on the left and on the right) and is not a biunique measuring value for the distance. Since the periodicity of the amplitudes in the measuring area 19 and the line frequency change at the same rate (compare sequence FIGS. 4a–c, on the left or on the right), a one-to-to-one correspondence (biunique values) can be achieved by a successive reduction of the line frequencies up to double the distance between the measuring area 19 and the detector 27.

Again, the dependency of the moiré pattern from the distance between the detector 27 and the workpiece 4 can observed. The detector 27 detects 'white' in the illustration on the left, and 'black' in the illustration on the right.

In the embodiment illustrated in FIG. 4c, the linear patterns 22, 23 have only a very low line frequency so that the moiré pattern 24 that forms by superposition has only a low line frequency. Depending on the distance between the detector 27 and the workpiece 4, the detector 27 detects 'white' in the measuring area 19 in the embodiment on the left (large distance), and also 'white' in the embodiment on the right (small distance).

If the different line frequencies according to FIGS. 4a–c are simultaneously projected, a direct, binary coding of the distance measure is possible. Depending on the distance between the detector 27 and the workpiece 4, different moiré patterns 24a, 24b are created when different line frequencies are projected simultaneously.

By using the moiré pattern 24, i.e., by projecting the line patterns 22, 23 on the object or workpiece 4 to be measured, the resolution of the endoscope unit 10 is utilized up to the resolution limit. Thereby, the smallest dimensions can be measured without any difficulties. For example, also the micro coarseness of a surface can be determined with the described procedure.

The measuring unit does not have to be arranged within a tool but it can also be employed as an independent measuring unit, separate from the tool. After the workpiece 4 has been machined with the tool 1, it is possible, for example, to insert the independent measuring unit into the bore 9 in order to conduct the desired measurements. The object to be measured does not have to be a workpiece but can be any suitable test piece of which dimensions are to be taken. In particular, dimensions of hollow bodies can be determined with the measuring unit. If the surface of the test piece is reflective, polarizing filters 21 are advantageously provided at the camera head 11 and at the lighting unit 12 in order to increase contrast of the projected moiré pattern 24. Instead of the polarizing filter 21, color-selecting methods can also be employed if the surfaces of the test piece 4 are reflective. The polarizing filters 21 at the camera head 11 and at the lighting unit 12 are arranged in a crossed position relative to one another. Instead of polarizing filters 21, color filters can also be employed at the camera head 11 and at the lighting unit 12. The beam splitters 17 of the endoscope unit 10 are accordingly embodied to be selective.

In order to increase the portion of the light being refracted at the surface (interior wall) 20 of the object or workpiece 4, the tools 1 can be provided with a surface structure or a coating for increasing the micro coarseness. It is also possible to employ machining emulsions in order to increase the micro coarseness.

Fluorescent colors can be applied to the surfaces 20 of the object or workpiece 4 in order to achieve a heightened contrast in the creation of the moiré pattern 24. However, the fluorescent colors can also serve as a separator between the projection beam (linear pattern projection) and the image beam (moiré pattern) of the endoscope unit 10.

It is also possible to utilize a sinusoidal intensity-modulated grit as an aid for phase determination in order to increase resolution for detection of said moiré pattern (24).

A particularly advantageous embodiment provides that the endoscope unit 10 is arranged within the tool 1 in the described manner. In that case, the machining and measuring procedures are performed without a tool change.

In principle, it is also possible to simultaneously monitor different machining areas at the workpiece 4 with the endoscope unit 10 via two view openings 14 provided at different locations of the tool 1. In order to be able to allocate the respective information optically, the light can, e.g., be polarized. In this case, the signals can be allocated to the respective view opening 14 by a different polarization. Another option for the allocation would be to use colored light with a selective beam splitter associated therewith. By means of the color distinction, the transmitted signals can also be allocated to the respective view opening 14.

Milling tools, hollowing tools, boring tools, grinding tools and the like are suitable tools to be equipped with the endoscope unit. In those cases, online measuring and online correction of the machining process are possible with such tools. The machining result can already be determined by the tool 1 during the machining process of the workpiece 4 and can be compared with set-point values. Depending on the result of the comparison between the set-point values and the determined values, a correction can be performed during the machining process.

The specification incorporates by reference the disclosure of German priority document 198 15 201.9 of Apr. 4, 1998.

The present invention is, of course, in no way restricted to the specific disclosure of the specification and drawings, but also encompasses any modifications within the scope of the appended claims.

What is claimed is:

1. A measuring unit for determining dimensions of workpieces, said measuring unit comprising:
   an endoscope unit (10);
   said endoscope unit (10) having two apertures (13a) through which identical linear patterns (22, 23) are projected onto a surface (20) of a workpiece, wherein said identical linear light patterns (22, 23) create a moiré pattern (24) on said surface (20);
   said endoscope unit (10) having at least one camera head (11) for detecting said moiré pattern (24).

2. A measuring unit according to claim 1, wherein said endoscope unit (10) is arranged within a tool (1).

3. A measuring unit according to claim 2, wherein said endoscope unit (10) is arranged within an axial bore (9) of said tool (1).

4. A measuring unit according to claim 1, wherein said endoscope unit (10) has a tube (13) having a free end, wherein said free end has at least two of said apertures (13a).

5. A measuring unit according to claim 1, further comprising at least one detector (27), wherein said endoscope unit (10) is arranged in a tool (1) having at least one view opening (14) and wherein said detector (27) is arranged behind said at least one view opening (14) inside said tool (1).

6. A measuring unit according to claim 1, further comprising lenses (18), wherein one of said lenses (18) is arranged slantedly downstream of each one of said apertures (13a).

7. A measuring unit according to claim 6, wherein said lenses (18) are slanted such that the light beams projected by said endoscope unit (10) and penetrating through said lenses (18) form said moiré pattern (24) on said surface (20).

8. A measuring unit according to claim 1, wherein said camera head (11) has a polarizing filter (21).

9. A measuring unit according to claim 1, wherein said endoscope unit (10) has a lighting unit (12) with a pattern projector.

10. A measuring unit according to claim 9, wherein said lighting unit (12) has a polarizing filter (21).

11. A measuring unit according to claim 1, further comprising color-selecting elements improving contrast of said moiré pattern (24).

12. A measuring unit according to claim 11, wherein said color-selecting elements are color filters or selective beam splitters.

13. A method for measuring dimensions of workpieces with a measuring unit according to claim 1, said method comprising the steps of:

a) creating a moiré pattern (24) on a surface (20) of a workpiece (4); and b) detecting and evaluating said moiré pattern (24).

14. A method according to claim 13, wherein said step a) includes projecting two identical linear patterns (22, 23) onto said surface (20) to form said moiré pattern (24).

15. A method according to claim 13, wherein said step a) includes simultaneously projecting different line frequencies onto said surface (20).

16. A method according to claim 13, further comprising the step of producing an increased micro coarseness on said surface (20) by providing said tools (1) for machining said workpiece (4) with a coarse surface in order to improve detection and evaluation of said moiré pattern (24).

17. A method according to claim 13, further comprising the step of producing an increased micro coarseness on said surface (20) by employing machining emulsions in order to improve detection and evaluation of said moiré pattern (24).

18. A method according to claim 13, further comprising the step of applying fluorescent colors to said surface (20) in order to improve detection and evaluation of said moiré pattern (24).

19. A method according to claim 13, further comprising the step of utilizing a sinusoidal intensity-modulated grit as an aid for phase determination in order to increase resolution for detection of said moiré pattern (24).

* * * * *